United States Patent
Moran et al.

(10) Patent No.: US 12,084,333 B2
(45) Date of Patent: Sep. 10, 2024

(54) COUNTERTOP HOT AND COLD POST-MIX BEVERAGE DISPENSER

(71) Applicant: Marco Beverage Systems Ltd., Dublin (IE)

(72) Inventors: Sean Martin Moran, Dublin (IE); Paul Drewry Pearson, County Donegal (IE); Paul Francis Stack, Dublin (IE)

(73) Assignee: Marco Beverage Systems Ltd., Dublin (IE)

( * ) Notice: Subject to any disclaimer, the term of this patent is extended or adjusted under 35 U.S.C. 154(b) by 59 days.

(21) Appl. No.: 17/599,142

(22) PCT Filed: Mar. 26, 2020

(86) PCT No.: PCT/EP2020/058611
§ 371 (c)(1),
(2) Date: Sep. 28, 2021

(87) PCT Pub. No.: WO2020/207819
PCT Pub. Date: Oct. 15, 2020

(65) Prior Publication Data
US 2022/0169490 A1    Jun. 2, 2022

(30) Foreign Application Priority Data
Apr. 10, 2019    (GB) .................................... 1905072

(51) Int. Cl.
*B67D 1/06*    (2006.01)
*A47J 31/40*    (2006.01)
(Continued)

(52) U.S. Cl.
CPC .......... *B67D 1/0021* (2013.01); *A47J 31/402* (2013.01); *A47J 31/461* (2018.08); *A47J 31/468* (2018.08);
(Continued)

(58) Field of Classification Search
CPC ........ A47J 31/201; A47J 31/40; A47J 31/402; A47J 31/468; A47J 31/52; A47J 31/54;
(Continued)

(56) References Cited

U.S. PATENT DOCUMENTS 4,860,923 A * 8/1989 Kirschner ............ B67D 1/1218
                                                        222/1
5,575,405 A * 11/1996 Stratton ............... B67D 1/0872
                                                       222/78
(Continued)

FOREIGN PATENT DOCUMENTS

EP      2916699 A2     9/2015
WO  20172011890 A1    12/2017

OTHER PUBLICATIONS

International Search Report / PCT/EP2020/058611 / Mailing Date Jul. 28, 2020 / Date of Completion May 25, 2020.

*Primary Examiner* — Charles P. Cheyney
(74) *Attorney, Agent, or Firm* — Fulwider Patton LLP

(57) ABSTRACT

A beverage dispense system for a countertop having a water inlet including a solenoid valve and a beverage concentrate inlet to which a bag-in-box containing a supply of liquid coffee concentrate is attached. A beverage dispense font is mounted on the countertop. A water conduit connects the water inlet with the dispense font. A separate liquid beverage concentrate conduit connects the beverage concentrate inlet with the beverage dispense font. An electric syrup pump pumps liquid coffee concentrate from the bag-in-box to the end of the dispense font. A control unit controls the separate delivery of water from the mains water inlet and/or liquid coffee concentrate to the end of the beverage dispense font. Where water and liquid coffee concentrate are delivered, they will mix in the beverage receptacle.

5 Claims, 4 Drawing Sheets

(51) Int. Cl.

| | |
|---|---|
| *A47J 31/46* | (2006.01) |
| *A47J 31/52* | (2006.01) |
| *A47J 31/54* | (2006.01) |
| *B67D 1/00* | (2006.01) |
| *B67D 1/04* | (2006.01) |
| *B67D 1/08* | (2006.01) |
| *B67D 1/12* | (2006.01) |

(52) U.S. Cl.
CPC ............... *A47J 31/52* (2013.01); *A47J 31/54* (2013.01); *B67D 1/004* (2013.01); *B67D 1/04* (2013.01); *B67D 1/06* (2013.01); *B67D 1/0857* (2013.01); *B67D 1/0885* (2013.01); *B67D 1/0888* (2013.01); *B67D 1/0895* (2013.01); *B67D 1/1202* (2013.01); *B67D 2001/0481* (2013.01); *B67D 2001/0827* (2013.01); *B67D 2210/00118* (2013.01)

(58) Field of Classification Search
CPC .......... B67D 7/80; B67D 7/82; B67D 1/0895; B67D 1/06; B67D 1/04; B67D 1/08; B67D 1/12
USPC ...................................................... 222/146.2

See application file for complete search history.

(56) References Cited

U.S. PATENT DOCUMENTS

| | | | | |
|---|---|---|---|---|
| 5,950,867 | A * | 9/1999 | Martindale | B67D 7/02 |
| | | | | 222/61 |
| 6,463,753 | B1 * | 10/2002 | Haskayne | B67D 1/0068 |
| | | | | 62/393 |
| 6,698,229 | B2 * | 3/2004 | Renken | B67D 1/0861 |
| | | | | 222/129.1 |
| 8,768,524 | B2 * | 7/2014 | Hammonds | B67D 1/0078 |
| | | | | 700/285 |
| 10,238,233 | B2 * | 3/2019 | Nuss | A47J 31/469 |
| 2004/0011814 | A1 * | 1/2004 | Andrews | A47J 31/469 |
| | | | | 222/129.1 |
| 2008/0314926 | A1 * | 12/2008 | Kumar | B67D 1/06 |
| | | | | 222/129.1 |
| 2010/0269707 | A1 | 10/2010 | Wiemer et al. | |
| 2011/0315711 | A1 * | 12/2011 | Hecht | B67D 1/0895 |
| | | | | 222/144.5 |
| 2014/0305313 | A1 * | 10/2014 | Waldron | A47J 31/469 |
| | | | | 99/290 |
| 2015/0097001 | A1 * | 4/2015 | Gatipon | B67D 1/0857 |
| | | | | 222/144.5 |
| 2016/0023880 | A1 * | 1/2016 | Forte | B67D 1/10 |
| | | | | 134/22.18 |
| 2019/0002264 | A1 * | 1/2019 | Madden | B67D 1/10 |
| 2019/0270630 | A1 * | 9/2019 | Dahan | C02F 1/325 |
| 2020/0270850 | A1 * | 8/2020 | Kop | B67D 1/0857 |
| 2021/0155465 | A1 * | 5/2021 | Crawford | B67D 1/0022 |

* cited by examiner

COUNTERTOP HOT AND COLD POST-MIX BEVERAGE DISPENSER

CROSS-REFERENCE TO RELATED APPLICATIONS

This application is based upon and claims the benefit of priority to Patent Application No. PCT/EP2020/058611, filed on Mar. 26, 2020, which claims priority to U.K. 1905072.3, filed Apr. 10, 2019, the contents of which are incorporated herein by reference.

TECHNICAL FIELD

This invention relates to a beverage dispense system and, in particular, to a dispense system for use in the preparation of beverages on a countertop in the hospitality industry.

BACKGROUND ART

Dispense systems are commonly used in the hospitality industry for producing beverages either by dedicated staff or in a self-service mode.

Thus, water boilers are available for providing a source of hot water for use in the preparation of beverages. An example of such a boiler is the Ecoboiler undercounter range of atmospheric boilers manufactured by Marco Beverage Systems Limited, 74 Heather Road, Sandyford Business Park, Dublin 18, Ireland. The boilers are designed to be located under a countertop in locations such as hotel and restaurant kitchens, coffee shops and canteens. The boilers come with single or dual dispense fonts and the larger models can accommodate up to three fonts from a single boiler. The hot water is pumped from the boiler for dispensing from the fonts.

However, if the consumer wishes to prepare a cup of coffee using hot water from the undercounter boiler he has to get the coffee component of the beverage from a separate source.

International Patent Publication No. WO 2012/031593 A1 describer a brewing device in which various hot and cold beverages are made from ingredients in an undercounter preparation part. The various beverages are dispensed from an outlet head on an outlet pipe mounted on the countertop. The various beverage ingredients are supplied via channel connections from the supply part, so that the individual beverages may be mixed in the outlet head itself.

As one of the beverage ingredients provided for in the brewing device of WO 2012/031593 is milk foam, the design of the outlet head has to cater for this ingredient and is somewhat complicated as a result and requires frequent cleaning.

It is an object of the present invention to overcome the disadvantages of the devices hereinbefore described.

DISCLOSURE OF INVENTION

Thus, the invention provides a beverage dispense system for a countertop, the dispense system comprising a mains water connection, a beverage concentrate inlet, to which a supply of liquid beverage concentrate is attachable in use, with both the mains water connection and the beverage concentrate inlet being locatable under the countertop, a beverage dispense font, locatable on the countertop, a water conduit connecting the beverage dispense font with the mains water connection and a separate liquid beverage concentrate conduit connecting the beverage dispense font with the beverage concentrate inlet, means for delivering liquid beverage concentrate from the beverage concentrate inlet to the beverage dispense font, and a control unit, which, in use, controls the separate delivery of water from the mains water connection, and/or liquid beverage concentrate to the beverage dispense font and from the beverage dispense font to an appropriate beverage receptacle.

An advantage of the beverage dispense system according to the invention is that, as the water and liquid beverage concentrate are delivered separately to the dispense font, the design of the system is straightforward.

A further advantage of the system is that, as no milk product is being dispensed from the system, the necessity for cleaning the system is reduced compared to milk-based systems.

A further advantage of the system is that, as only the beverage dispense font is located above the countertop, there is plenty of free space thereon for the preparation various additional beverages based on the beverages produced by the system.

In one embodiment of the invention, the dispense system further comprises an undercounter water boiler, in fluid communication with the beverage dispense font by way of a boiler conduit and under the control of the control unit.

An advantage of this aspect of the invention is that the range of beverages that can be prepared using the system is increased.

Preferably the undercounter water boiler is an atmospheric boiler capable of providing water at a number of discrete temperatures through the boiler conduit.

An advantage of this aspect of the invention is that the range of beverages that can be prepared using the system is further increased.

Further, preferably, the atmospheric water boiler is in fluid communication with the mains water connection such that, in use, mains water is deliverable, through the water boiler to the beverage dispense font at ambient temperature, as one of the discrete temperatures.

An advantage of this aspect of the invention is that water of a particular temperature is deliverable from the boiler to the dispense font under the control of the control unit, and a separate mains supply is not required where a particular beverage uses water at ambient temperature.

In a further embodiment of the invention, the dispense system further comprises a water chiller unit located between the mains water connection and the dispense font for delivering chilled water to the dispense font in use, if required.

An advantage of this aspect of the invention is that, where chilled water is required for a particular beverage, water delivered from the boiler may be chilled before reaching the dispense font and a separate liquid communication path is not required.

In a further embodiment of the invention, where the supply of liquid beverage concentrate is in a bag-in-box, the liquid beverage concentrate delivering means is an electric syrup pump, which pumps the liquid beverage concentrate through the beverage concentrate conduit.

An advantage of this aspect of the invention is that the electric syrup pump will draw the liquid beverage concentrate from the bag-in-box at a rate which is independent of the volume of liquid beverage concentrate remaining in the bag-in-box.

Alternatively, where the supply of liquid beverage concentrate is in a pressurised keg, the liquid beverage concentrate delivering means is a solenoid valve, located in the beverage concentrate conduit, which solenoid valve, when opened in use, releases the pressurised liquid beverage concentrate from the keg to the beverage dispense font.

An advantage of this aspect of the invention is that starting and stopping of the delivery of the liquid beverage concentrate is immediate due to the action of the solenoid valve.

In a further embodiment of the invention, the beverage concentrate inlet is mounted in a refrigerated unit, which refrigerated unit houses the supply of liquid beverage concentrate in use.

An advantage of this aspect of the invention is that the shelf life of a labile liquid beverage concentrate can be increased where it is stored in the refrigerated unit.

In a further embodiment of the invention, one or more beverage selection buttons are mounted on the countertop.

An advantage of this aspect of the invention is that the control unit can be programmed to deliver the volume and content of a particular beverage by operating the appropriate button on the countertop.

Preferably, the or each beverage selection button is mounted on the beverage dispense font.

An advantage of this aspect of the invention is that accidental operation of a button is reduced by locating the buttons above the countertop.

In a further embodiment of the invention, the dispense system further comprises a supply of liquid tea concentrate attached to the beverage concentrate inlet.

An advantage of this aspect of the invention is that a variety of hot, cold or chilled tea beverages of varying strength can be delivered from the beverage dispense font.

Once the beverage has been delivered to the beverage receptacle additional ingredients, such as milk, sugar, and/or ice cubes may be added by the server or consumer.

In a further embodiment of the invention, the dispense system further comprises a supply of liquid coffee concentrate attached to the beverage concentrate inlet.

An advantage of this aspect of the invention is that a variety of hot, cold or chilled coffee beverages of varying strength can be delivered from the beverage dispense font.

Once the beverage has been delivered to the beverage receptacle additional ingredients, such as milk, sugar, and/or ice cubes may be added by the server or consumer. A cappuccino or latte may be prepared on the countertop using additional equipment, which does not form part of the dispense system according to the invention.

Preferably, the supply of liquid coffee concentrate is cold brewed coffee concentrate.

An advantage of this aspect of the invention is that cold brewed coffee concentrate has been found to produce consistent coffee beverages with pleasing organoleptic characteristics.

In a further embodiment of the invention, the dispense system further comprise a draft tap dispense unit locatable on the countertop and in separate fluid communication with the electrical syrup pump, a supply of nitrogen, and a venturi connection located between the beverage concentrate inlet and the draft tap dispense unit, through which, in use, gaseous nitrogen is introduced into the liquid coffee concentrate for delivery from the draft tap dispense unit.

An advantage of this aspect of the invention is that a nitro coffee can be dispensed as part of the beverage offering.

In a further embodiment of the invention, the dispense system further comprise a draft tap dispense unit locatable on the countertop and in separate fluid communication with a source of pre-nitrogenated liquid coffee concentrate.

An advantage of this aspect of the invention is that use of a source of pre-nitrogenated liquid coffee concentrate eliminates the requirement of a venturi connection.

The invention will be further illustrated by the following description of embodiments thereof, given by way of example only with reference to the accompanying drawings in which:

BEST MODE FOR CARRYING OUT THE INVENTION

Figure 1:
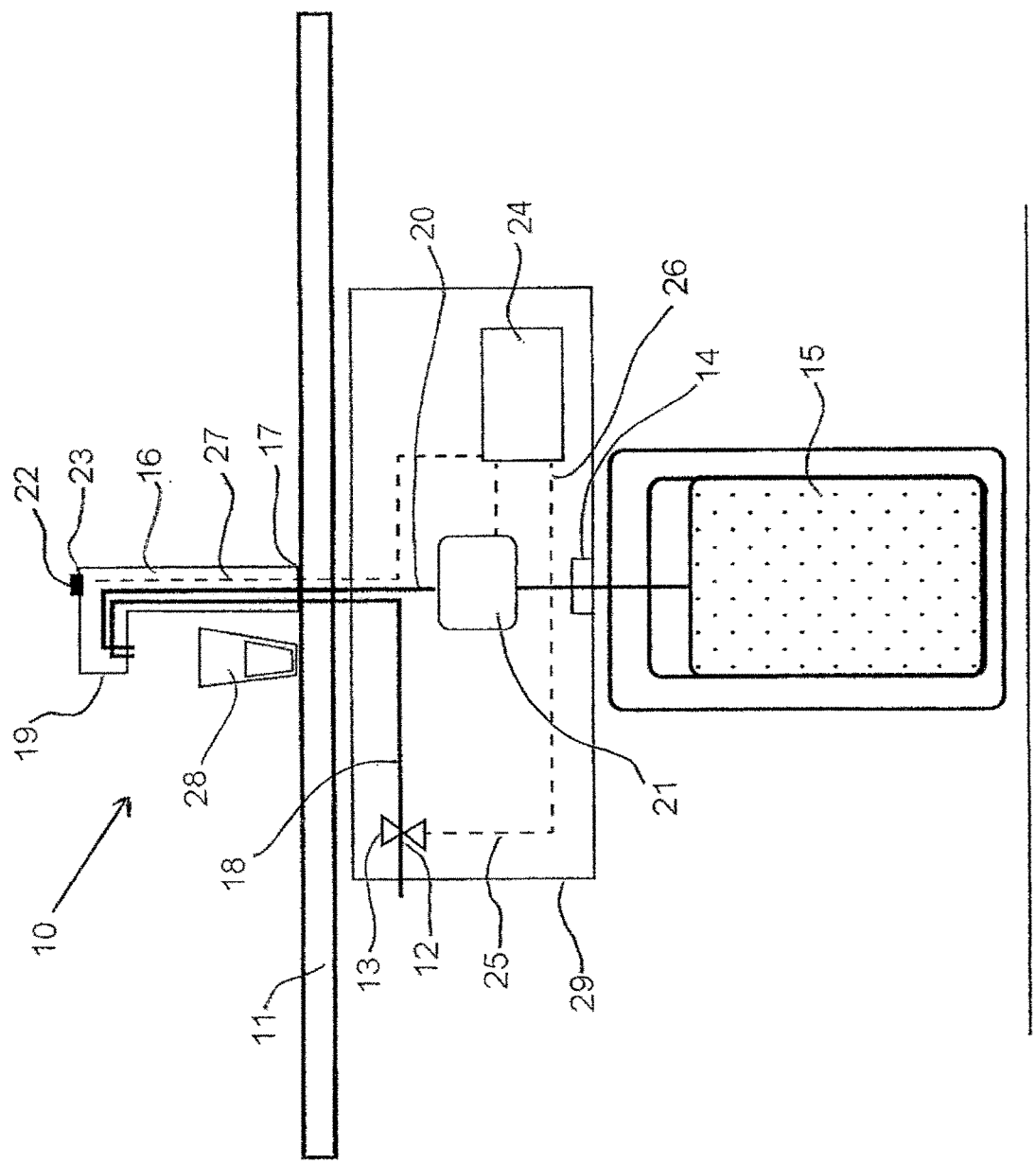
FIG. 1 is a schematic representation of a first embodiment of a beverage dispense system in accordance with the invention.

Referring to FIG. 1, there is illustrated generally at 10, a first embodiment of a beverage dispense system for a countertop 11 in accordance with the invention. The beverage dispense system 10 has a mains water inlet 12 which includes a mains solenoid valve 13 and a beverage concentrate inlet 14 to which a bag-in-box 15 containing a supply of liquid coffee concentrate is attached, with both the mains water inlet 12 and the beverage concentrate inlet 14 being located under the countertop 11. A beverage dispense font 16 is mounted on the countertop 11 at position 17.

A water conduit 18 connects the water inlet 12 with the dispense font 16, through which it runs to emerge at end 19 thereof. A separate liquid beverage concentrate conduit 20 connects the beverage concentrate inlet 14 with the beverage dispense font 16, through which it runs to also emerge at end 19 thereof. An electric syrup pump 21 pumps liquid coffee concentrate from the bag-in-box 15 to end 19 of the dispense font 16, when required. A selection button 22 is mounted on the dispense font 16 at position 23.

A control unit 24 is mounted under the countertop 11 and is in electrical communication with the water inlet 12 through wire 25, to the electric syrup pump 21 by wire 26 and to the selection button 22 by wire 27, with each of the wires 25, 26 and 27 being indicated by dotted lines.

In use, the control unit 24 controls the separate delivery of water from the mains water inlet 12, and/or liquid coffee concentrate to end 19 of the beverage dispense font 16 and from end 19 to an appropriate beverage receptacle 28, with the delivery being initiated by pressing selection button 22. Where water and liquid coffee concentrate are delivered, they will mix in the beverage receptacle 28.

The mains water inlet 12, beverage concentrate inlet 14, electrical syrup pump 21, and control unit 24 are all located in an undercounter housing unit 29.

Figure 2:
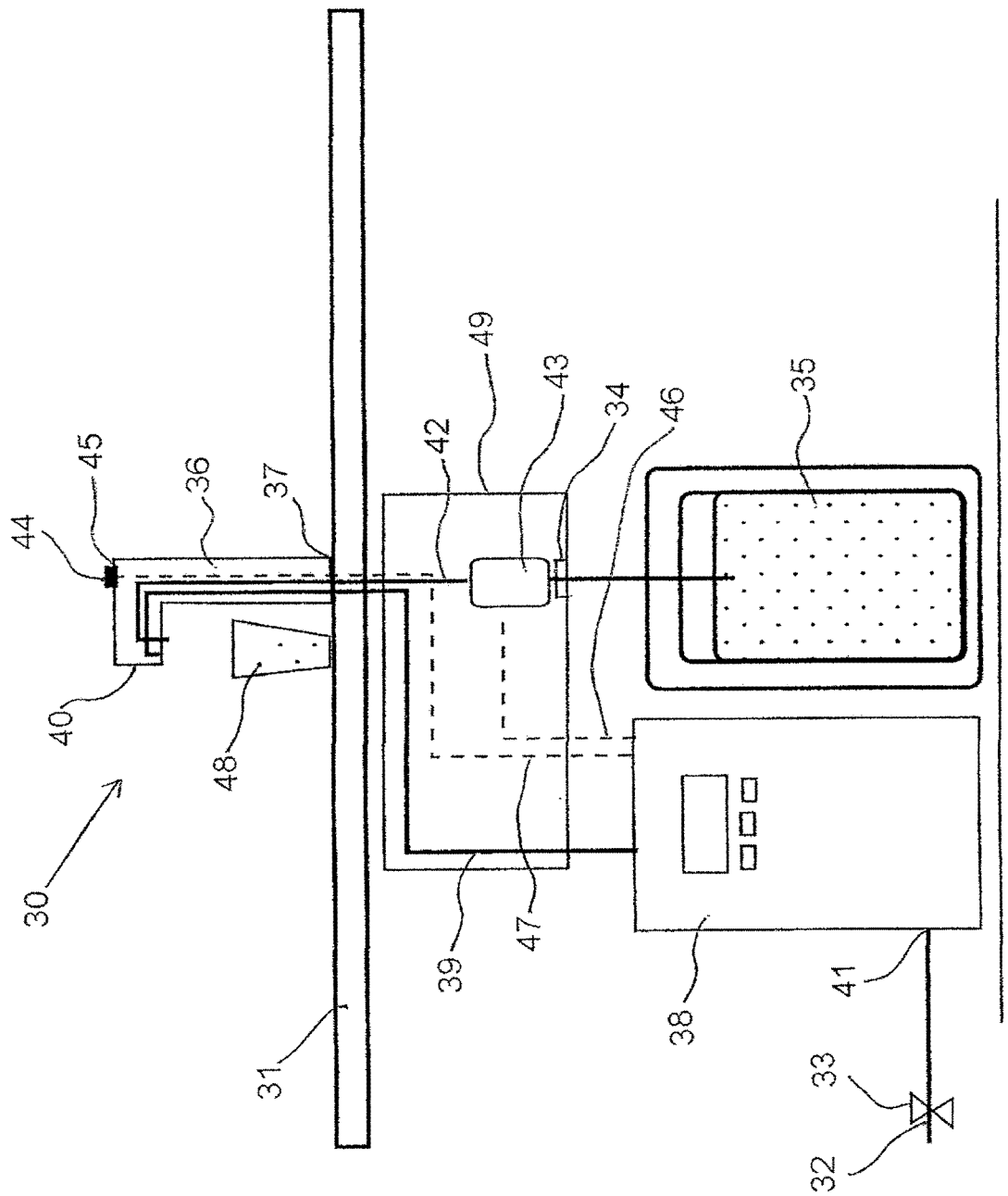
FIG. 2 is a schematic representation of a further embodiment of a beverage dispense system in accordance with the invention.

Referring to FIG. 2, there is illustrated generally at 30, a further embodiment of a beverage dispense system for a countertop 31 in accordance with the invention. The beverage dispense system 30 has a mains water inlet 32 which includes a mains solenoid valve 33 and a beverage concentrate inlet 34 to which a bag-in-box 35 containing a supply of liquid coffee concentrate is attached, with both the mains water inlet 32 and the beverage concentrate inlet 34 being located under the countertop 31. A beverage dispense font 36 is mounted on the countertop 31 at position 37.

An undercounter atmospheric water boiler 38 is connected by a water conduit 39 with the dispense font 36, through which it runs to emerge at end 40 thereof. The mains water inlet 32 is connected to the water boiler 38 at position 41. A separate liquid beverage concentrate conduit 42 connects the beverage concentrate inlet 34 with the beverage dispense font 36, through which it runs to also emerge at end 40 thereof. An electric syrup pump 43 pumps liquid coffee concentrate from the bag-in-box 35 to end 40 of the dispense font 36, when required. A selection button 44 is mounted on the dispense font 36 at position 45.

A control unit (not shown) is housed in the water boiler 38 and is in electrical communication with the water inlet 32. The control unit is also in electrical connection with the electric syrup pump 43 by wire 46 and to the selection button 44 by wire 47, with each of the wires 46 and 47 being indicated by dotted lines.

In use, the control unit in the water boiler 38 controls the separate delivery of water from the water boiler 38, and/or liquid coffee concentrate to end 40 of the beverage dispense font 36 and from end 40 to an appropriate beverage receptacle 48, with the delivery being initiated by pressing selection button 44. Where water and liquid coffee concentrate are delivered, they will mix in the beverage receptacle 48.

The beverage concentrate inlet 34 and the electrical syrup pump 43, are located in an undercounter housing unit 49.

The water boiler 38 can deliver water at different temperatures, including ambient temperature, depending on the particular beverage being prepared.

Figure 3:
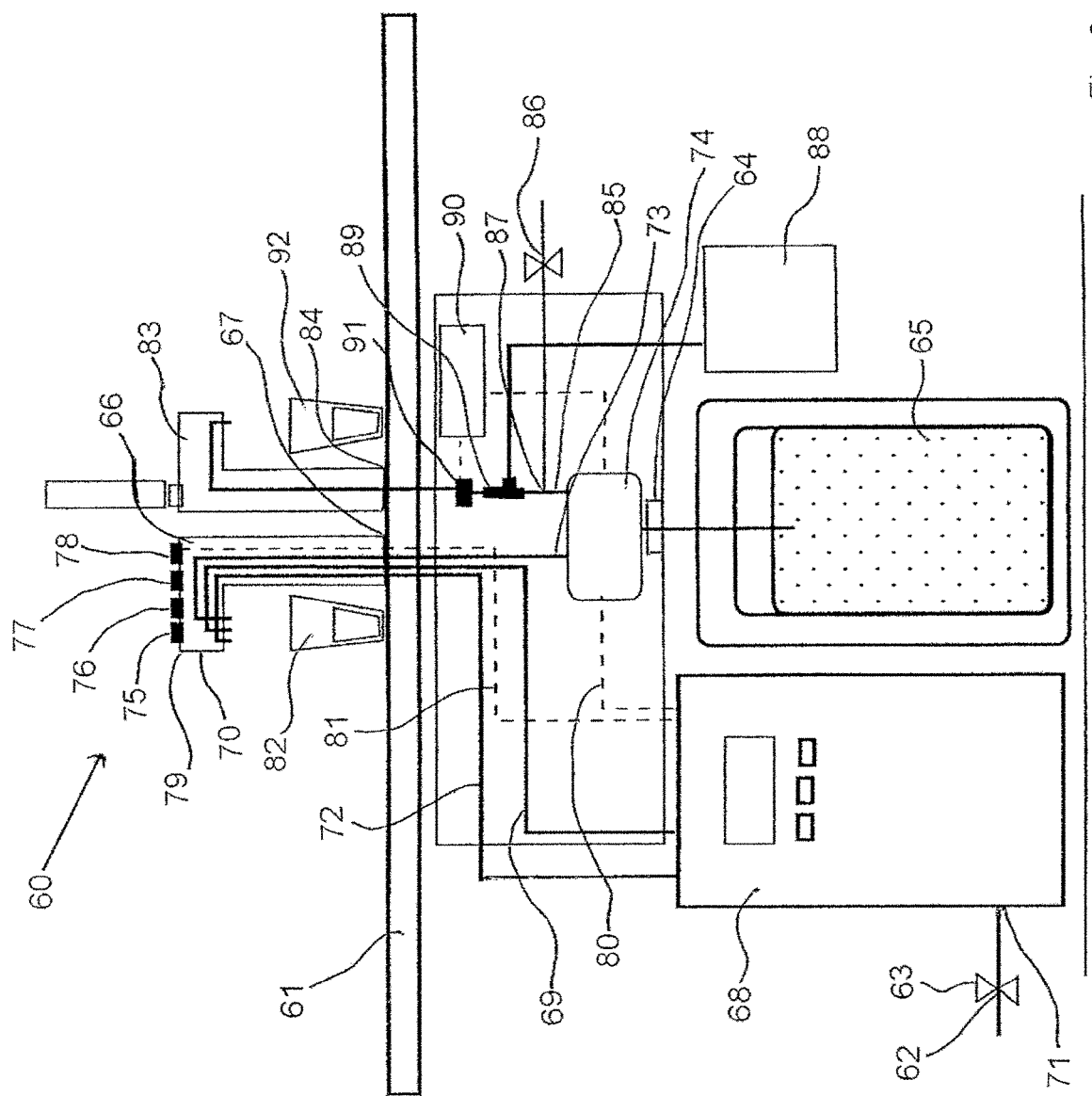
FIG. 3 is a schematic representation of a further embodiment of a beverage dispense system in accordance with the invention.

Referring to FIG. 3, there is illustrated generally at 60, a further embodiment of a beverage dispense system for a countertop 61 in accordance with the invention. The beverage dispense system 60 has a mains water inlet 62 which includes a mains solenoid valve 63 and a beverage concentrate inlet 64 to which a bag-in-box 65 containing a supply of liquid coffee concentrate is attached, with both the mains water inlet 62 and the beverage concentrate inlet 64 being located under the countertop 61. A beverage dispense font 66 is mounted on the countertop 61 at position 67.

An undercounter atmospheric water boiler 68 is connected by a water conduit 69 with the dispense font 66, through which it runs to emerge at end 70 thereof. The mains water inlet 62 is connected to the water boiler 68 at position 71. The water boiler 68 is also connected by an ambient water conduit 72 with the dispense font 66, through which it runs to emerge at end 70 thereof.

A separate liquid beverage concentrate conduit 73 connects the beverage concentrate inlet 64 with the beverage dispense font 66, through which it runs to also emerge at end 40 thereof. An electric syrup pump 74 pumps liquid coffee concentrate from the bag-in-box 65 to end 70 of the dispense font 66, when required.

Four selection buttons 75, 76, 77 and 78 are mounted on the top 79 of the dispense font 66.

A control unit (not shown) is housed in the water boiler 68 and is in electrical communication with the water inlet 62. The control unit is also in electrical connection with the electric syrup pump 74 by wire 80 and to the selection buttons 75, 76, 77 and 78 by wire 81, with each of the wires 80 and 81 being indicated by dotted lines.

In use, the control unit in the water boiler 68 controls the separate delivery of water from the water boiler 68, and/or liquid coffee concentrate to end 70 of the beverage dispense font 66 and from end 70 to an appropriate beverage receptacle 82, with the delivery being initiated by pressing one of selection buttons 75, 76, 77, or 78. If selection button 75 is activated a shot of concentrated coffee is delivered from the dispense font 66. If selection button 76 is activated cold water and coffee concentrate are delivered from the dispense font 66. If selection button 77 is activated hot water and coffee concentrate are delivered from the dispense font 66. Finally, if selection button 78 is activated hot water is delivered from the dispense font 66. Where water and liquid coffee concentrate are delivered, they will mix in the beverage receptacle 82.

A draft dispense unit 83 is mounted on the countertop 61 at position 84. A second liquid beverage concentrate conduit 85 connects the electric syrup pump 74 with the draft dispense unit 83. A second mains water inlet 86 connects into the second liquid beverage concentrate conduit 85 at position 87. A nitrogen source connects to the second liquid beverage concentrate conduit 85 through a venturi connection 89. A nitro control unit 90 is in electrical communication with the electrical syrup pump 74, the second mains inlet 86 and a pressure switch 91, such that, in use, operation of the draft dispense unit 83 causes nitrogen infused coffee concentrate and water to be delivered to receptacle 92.

Figure 4:
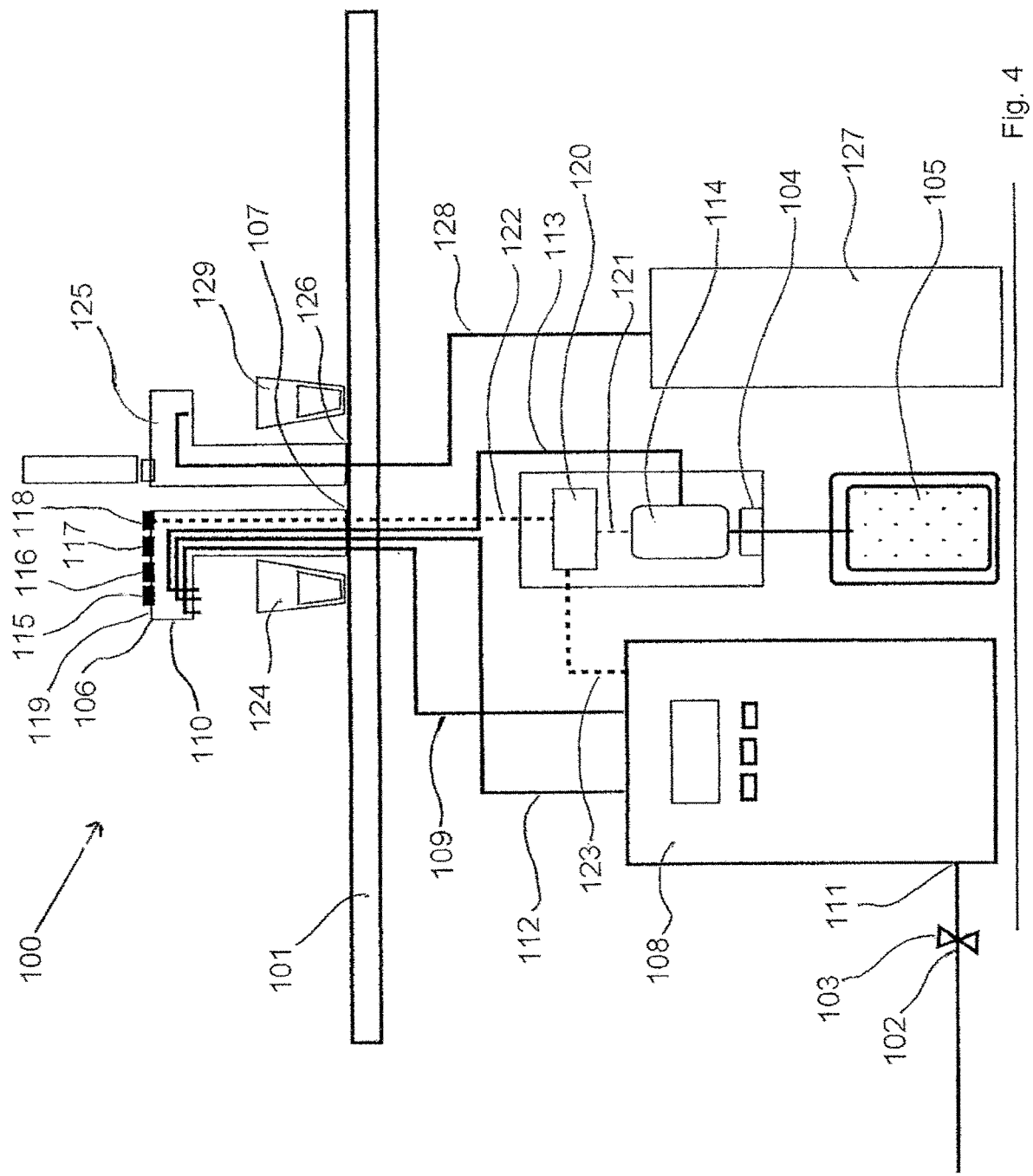
FIG. 4 is a schematic representation of a further embodiment of a beverage dispense system in accordance with the invention.

Referring to FIG. 4, there is illustrated generally at 100, a further embodiment of a beverage dispense system for a countertop 101 in accordance with the invention. The beverage dispense system 100 has a mains water connection 102 which includes a mains solenoid valve 103 and a beverage concentrate inlet 104 to which a bag-in-box 105 containing a supply of liquid coffee concentrate is attached, with both the mains water inlet 102 and the beverage concentrate inlet 104 being located under the countertop 101. A beverage dispense font 106 is mounted on the countertop 101 at position 107.

An undercounter atmospheric water boiler 108 is connected by a water conduit 109 with the dispense font 106, through which it runs to emerge at end 110 thereof. The mains water inlet 102 is connected to the water boiler 108 at position 111. The water boiler 108 is also connected by an ambient water conduit 112 with the dispense font 106, through which it runs to emerge at end 110 thereof.

A separate liquid beverage concentrate conduit 113 connects the beverage concentrate inlet 104 with the beverage dispense font 106, through which it runs to also emerge at end 110 thereof. An electric syrup pump 114 pumps liquid coffee concentrate from the bag-in-box 105 to end 110 of the dispense font 106, when required.

Four selection buttons 115, 116, 117 and 118 are mounted on the top 119 of the dispense font 106.

A control unit 120 is mounted below the countertop and is in electrical communication with the water inlet 102. The control unit 120 is also in electrical connection with the electric syrup pump 114 by wire 121 and to the selection buttons 115, 116, 117 and 118 by wire 122. The control unit 120 is also in electrical communication with the water boiler 108 by wire 123 with each of the wires 121,122, and 123 being indicated by dotted lines.

In use, the control unit 120 controls the separate delivery of water from the water boiler 108, and/or liquid coffee concentrate to end 110 of the beverage dispense font 106 and from end 110 to an appropriate beverage receptacle 124, with the delivery being initiated by pressing one of selection buttons 115, 116, 117, and 118. If selection button 115 is activated a shot of concentrated coffee is delivered from the dispense font 106. If selection button 166 is activated cold water and coffee concentrate are delivered from the dispense font 106. If selection button 117 is activated hot water and coffee concentrate are delivered from the dispense font 106. Finally, if selection button 118 is activated hot water is delivered from the dispense font 106. Where water and liquid coffee concentrate are delivered, they will mix in the beverage receptacle 124.

A draft dispense unit 125 is mounted on the countertop 101 at position 126. A source of pre-nitrogenated liquid coffee concentrate 127 is located under the countertop 101 and a nitro conduit 128 connects it to the draft dispense unit 125. In use operation of the draft dispense unit 125 causes nitrogen-infused coffee concentrate to be delivered to a receptacle 129.

The invention claimed is:

1. A dispensing system for delivering heated beverages, comprising:
    a first font mounted above a countertop, the first font configured with beverage selection controls for dispensing multiple beverages through said first font;
    a housing disposed below said countertop, said housing enclosing:
        a controller;
        a water inlet valve connected to the controller; and
        a liquid concentrate pump connected to the controller;
    a container of liquid concentrate below said countertop and exterior to the housing, said container of liquid concentrate in fluid communication with the liquid concentrate pump;
    a first conduit connecting the liquid concentrate pump to the first font at a first outlet via the housing, said first conduit passing through the countertop;
    a second conduit connecting the water valve to the first font at a second outlet via the housing, said second conduit passing through the countertop; and
    a water boiler disposed below said countertop and exterior to the housing, and a third conduit connecting the water boiler, via the housing, to the first font, the third conduit passing through the countertop.

2. The dispensing system of claim 1, further comprising a nitrogen source disposed below said countertop and exterior to the housing, and a nitrogen control unit enclosed by said housing.

3. The dispensing system of claim 2, further comprising a second font, and a nitrogen conduit connecting the nitrogen source, via the housing, to the second font.

4. The dispensing system of claim 3, wherein the housing further encloses a venturi connection on the nitrogen conduit.

5. The dispensing system of claim 1, wherein the housing is configured with a water inlet, a liquid concentrate inlet, and a nitrogen inlet, and respective water, liquid concentrate, and nitrogen outlets.

* * * * *